Nov. 10, 1942.　　　K. KOEHL　　　2,301,414
PROJECTOR STAND
Filed Oct. 12, 1938　　　2 Sheets-Sheet 1
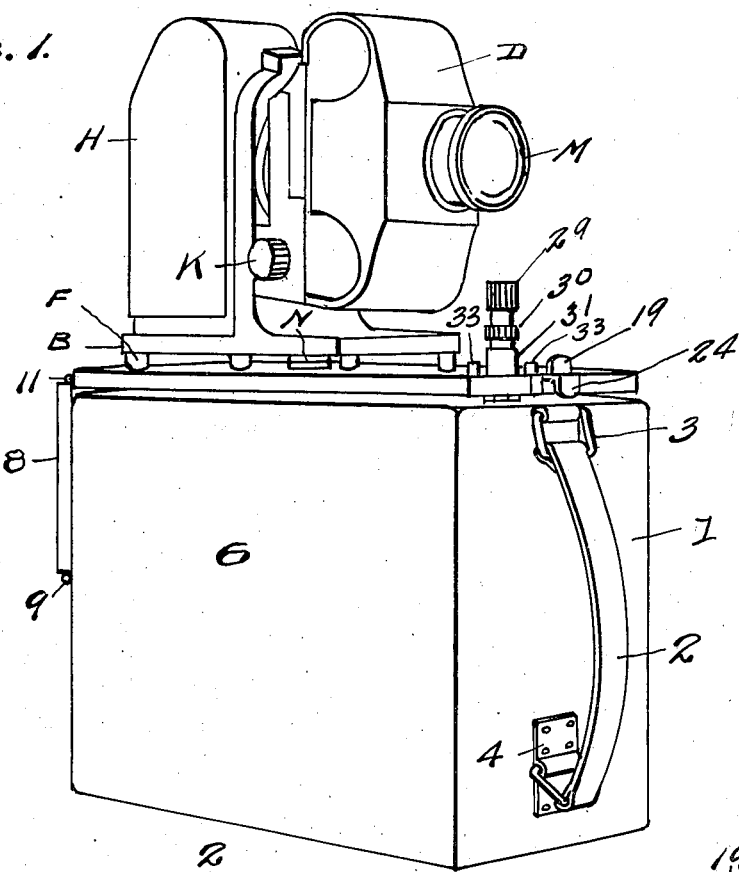
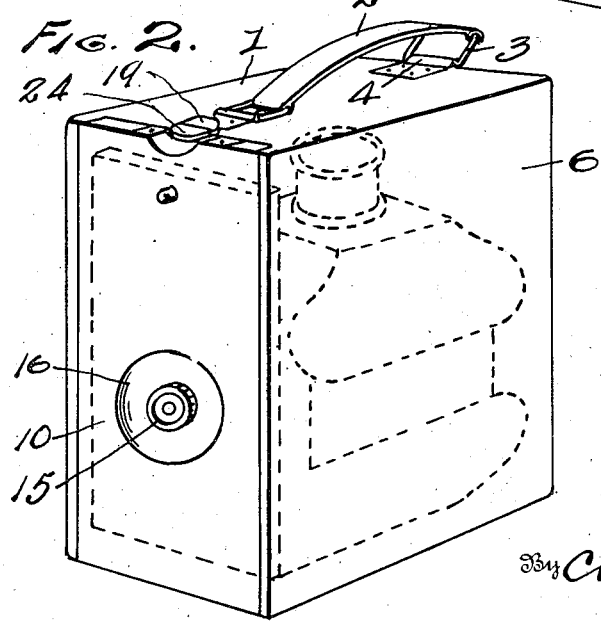
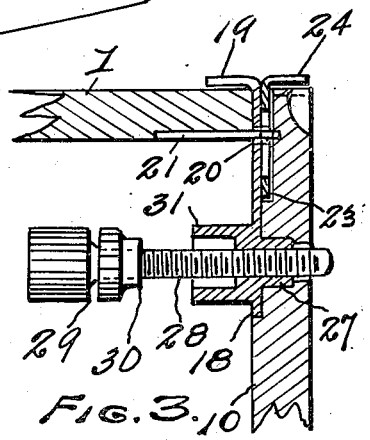
Inventor
KONRAD KOEHL
By Chas K. Davies & Son
Attorney Nov. 10, 1942.    K. KOEHL    2,301,414
PROJECTOR STAND
Filed Oct. 12, 1938    2 Sheets-Sheet 2
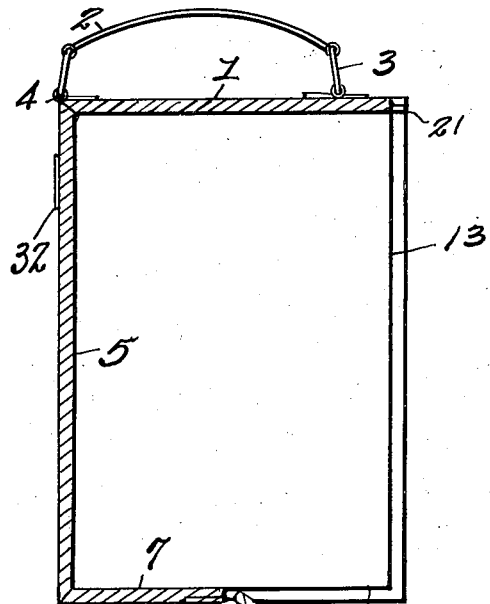
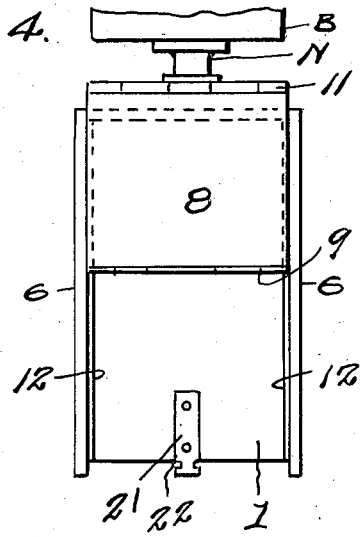
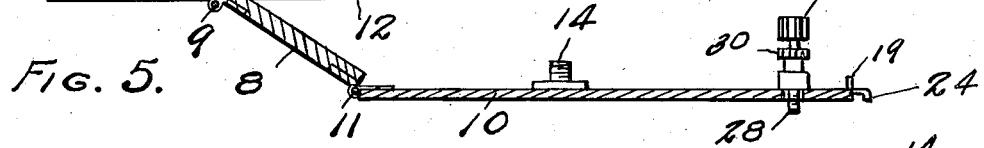
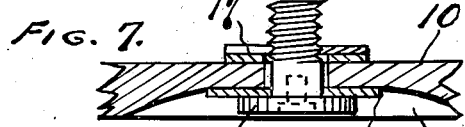
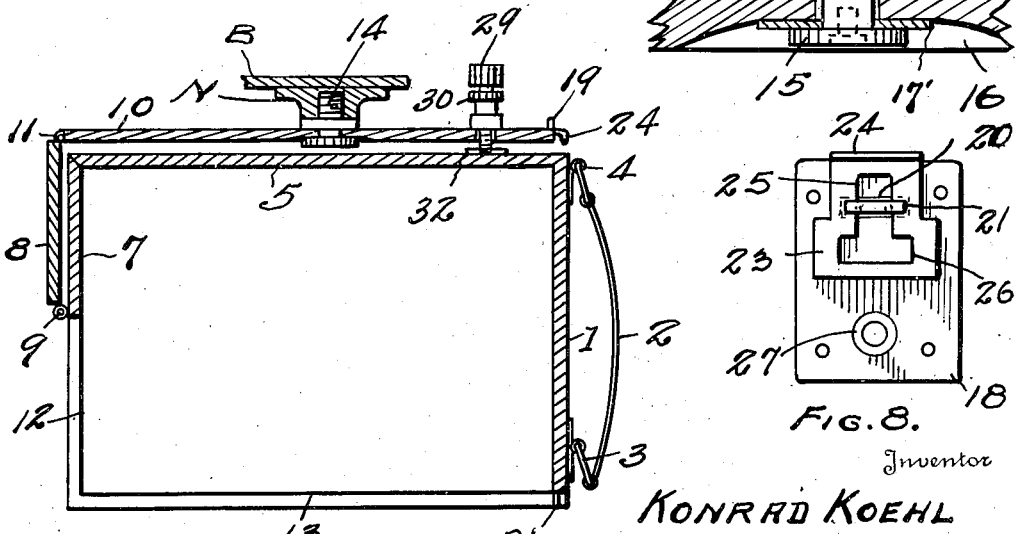
Inventor
KONRAD KOEHL
By Chas K. Davies + Son
Attorney Patented Nov. 10, 1942

2,301,414

UNITED STATES PATENT OFFICE 2,301,414

PROJECTOR STAND

Konrad Koehl, Dresden, Germany; vested in the Alien Property Custodian

Application October 12, 1938, Serial No. 234,706

3 Claims. (Cl. 312—20)

My present invention relates to a projector stand, case, or box, which also performs the functions of a carrier as well as a storage case or casing for the projector. While I have illustrated the stand in use with a projector, it will be understood that the stand is adapted for use with other instruments that are portable and are suitable for combination with the novel box or case.

The projector herein illustrated is an optical apparatus for projecting images of objects, real pictures or photographs, from a film strip, or from a plate, upon a screen, and preferably in enlarged form.

The primary object of the invention is to provide a convenient storage case, carrier, and stand for the projector, by means of which the projector is stored for protection, may be transported with facility, and the projector is attached to the storage case to form a part thereof. The storage case is constructed and arranged, and the projector is combined therewith in such manner that the projector may with facility and convenience be set up for use, and after the projection of pictures, the projector may with equal facility and convenience be restored to its storage case, and thereafter the case may be used as a carrier for the projector.

The storage case may quickly be converted into a supporting stand for the projector that is combined therewith, and a portion of the supporting stand on which the projector is mounted may readily be adjusted for focusing the projector on the screen.

Means are also provided for attachment and detachment of parts of the case that are utilized in converting the case into a stand, and for restoring the stand to the formation of the carrying case.

The invention consists essentially in certain novel combinations and arrangements of parts involving a storage case having walls or panels that are adapted to be unfolded and relocated for the formation of the supporting stand; in means for adjusting the projector that is mounted on one of the unfolded walls; in means for fastening together the folded parts to form the storage case or carrier; and in other details of construction as will hereinafter be more fully set forth and claimed.

In the accompanying drawings I have illustrated one complete example of the physical embodiment of my invention wherein the parts are combined and arranged in accordance with one mode I have thus far devised for the practical application of the principles of my invention, but it will be understood that various changes and alterations may be made in these exemplifying structures, within the scope of my claims without departing from the principles of my invention.

Figure 1 is a perspective view showing the projector set up on the stand for use in projecting pictures.

Figure 2 is a perspective view of the device of my invention used as a carrying case, showing the projector in dotted lines.

Figure 3 is an enlarged detail sectional view at the locking or latching corner of the carrying case, showing the lock or latch, and also the adjusting device for the projector.

Figure 4 is a rear elevation of the stand as in Figure 1.

Figure 5 is a longitudinal sectional view of the case in upright position, illustrating the manner of unfolding the panels preparatory to converting the case into a stand.

Figure 6 is a longitudinal vertical sectional view of the stand, as in Figure 1, a portion only of the projector being illustrated as mounted on the unfolded panel.

Figure 7 is an enlarged detail view partly in section, showing the screw fastener by means of which the projector is attached to a folding panel of the case.

Figure 8 is an inner face view of the latch device.

In order that the general arrangement and relation of parts may readily be understood I have shown in Figure 1 a projector having a base B, and feet or pads F, which pads are used when the projector is detached from the case or stand, but are not employed when the projector is mounted on the stand as in Figure 1. The projector has a lamp housing H, a head D in which the lens M is mounted, and the projector is operated by turning the knob K.

If desired, the projector may be employed separated from the stand, but preferably the projector is combined with the case and attached thereto so that the projector and case form a combination structure. For this purpose the base B, at its underside, is provided with an attaching nut N, rigidly fastened to the base, and the nut is threaded and adapted to receive a threaded screw or bolt mounted to turn in an unfolding panel of the case, as will be described.

The carrying case is preferably of rectangular shape, and is of appropriate size to receive the projector, as indicated in Figure 2, together with the electric cords or cables (not shown) for plugging in the projector with a source of electric supply.

In the position of Figure 2 where the case is used for storage of the projector, or for carrying purposes, the top wall 1 of the case is provided with a handle 2 that is loosely connected by links 3 with hinges 4 secured to the exterior face of the top wall, and this top wall becomes the front wall of the stand in Figure 1. Hereinafter the wall 1 will be referred to as the front wall of the stand, and the wall 5 of the casing, at right angles to the front wall 1 will be referred to as the top wall of the stand. In addition, the stand has two side walls 6, 6, and as here shown a half back wall 7, the bottom of the stand and the lower half of the back wall of the stand being open so that the stand may rest upon a table or other support and be supported on the four edges around the open bottom of the stand as indicated in Figure 6.

The cut-away back wall 7 is provided with a hinged half-wall or panel 8 that is hinged at 9 to the edge of the wall 7, and this panel 8 will hereinafter be referred to as a supporting panel. A second panel 10 that is adapted to close the open bottom of the stand is a base-panel that is hinged at 11 to the free edge of the supporting-panel 8, the two hinges 9 and 11 being in parallelism. In Figure 1 it will be seen that the supporting-panel 8 supports the base-panel 10 after the latter has been turned over the top wall 5 of the stand, the supporting panel being located at the rear end of the base panel, and the front portion of the base-panel is adjustably supported on the top wall 5 as will be described.

The projector is attached to and mounted on the base-panel 10 through the use of the threaded nut N on the projector base B, and an attaching screw 14 having a knurled head 15, which screw is journaled to turn in the base-panel 10, the under face of the base-panel being countersunk as indicated at 16, Figure 7, to permit ready access of the fingers and thumb for turning the screw.

Suitable retaining washers 17 and 17' are employed in connection with the attaching screw for retaining the screw in its journal bearing in the base-panel, and also for use in frictionally clamping the washers 17 against the nut N on the projector-base.

The attaching screw 14, as indicated in Figure 5, is mounted on the side of the panel 10 that becomes the outer or upper face of the base-panel of the stand, and when these two hinged panels are folded in position to form the case or carrier for the projector, the screw is on the inside of the base-panel, and the screw of course supports the projector within the carrying case or storage box.

As best seen in Figures 4, 5, and 6, the edges of the walls at the openings of the casing are formed with ledges as 12 and 13 against which the opposite lateral edges of the base-panel and the opposite lateral edges of the supporting-panel fit, when the panels are folded into closed position, and of course these ledges limit any inward movement of the panels beyond the specific folding movement of the panels.

When the two panels have been folded into place, the case is latched to provide a closed storage receptacle, as well as a closed carrying-case for the projector, and for this purpose the free end of the base-panel 10 is provided with an attaching plate 18 (Fig. 8) secured thereto by screws or other suitable means. As best seen in Figure 3 this attaching plate has an angular lug 19 that fits over the free edge of the top wall 1, and it acts as a guide for the hinged base-panel as it is being folded into place to form the carrying case, as well as a retaining lug for the base-panel preparatory to fastening the folded panel in place as part of the carrying-case.

As best seen in Figures 3 and 4, on the inner face of the top wall 1, at its free edge, is fastened a keeper-plate 21 having a notched end 22 that projects beyond the edge of the wall, and this notched end of the keeper or keeper plate is adapted to pass through and project beyond a complementary slot 20 in the attaching plate. Thus, in Fig. 3, when the panel 10 is turned up to closed position, the slot 20 slips over the notched end 22 of the keeper-plate, leaving this notched end projecting through the slotted plate, and the material of the panel 10 is cut away to accommodate this projecting notched end.

The keeper-plate of the wall 1 and the attaching plate of the base-panel 10 are fastened together by means of a slidable latch plate 23 mounted in a recess between the attaching plate and the recess-wall of the panel 10, and this latch-plate has an exterior handle 24 that is adapted to be engaged by the thumb or finger in sliding the plate into and out of latched position. The slide plate is fashioned with a narrow groove or slot 25, the opposite walls of which fit into the notches 22 of the plate 21, thereby retaining the slide plate against lateral movement, and also guiding the plate in its movement. This narrow slot opens into a wider slot 26 in the slide plate, and this wider slot is greater in width than the width of the notched plate 21. In Fig. 3 the parts are in latched position, as also indicated in Figure 8. By placing the finger beneath handle 24 plate 23 may be lifted until wide slot 26 straddles the notched end 22, thereby unlatching the fastener, and then panel 10 may be swung to the right in Figure 3 to release the unfoldable base-panel.

After release of the panel 10, this panel, with the projector mounted thereon, and the hinged, supporting-panel 8, are swung down to the position of Figure 5. Then the panels with the projector are swung downwardly and to the left, the carrying-case is swung down to the right from position of Figure 5 to that of Figure 6, and finally a continued swinging upwardly to the left brings the supporting panel 8 to upright position of Figure 6, after which the base-panel 10 is swung over to the right and down to the top wall 5 of the carrying-case.

The combined apparatus is understood to be resting upon a table or other suitable support, as in Figure 1, and usually the front of the projector is required to be tilted upwardly in order to properly focus the displayed pictures upon the screen, and for thus vertically adjusting the projector the base-panel is adjusted on the hinge 11 as a pivot, and of course the projector is simultaneously adjusted with the base-panel.

In addition to the adjusting feature of the hinge 11 as a pivot the hinge 9, as in Figure 6, in addition to supporting the base-panel and the projector at the rear of the stand, also acts as an adjusting pivot, so that the projector with the base-panel may be advanced or retracted slightly, if required in focusing the projector.

For thus vertically adjusting the projector I use an integral threaded bushing 27 on the attaching plate 18 (Figure 3) which bushing is seated in a socket of the base-panel 10, and an adjusting screw 28 with a head 29 is threaded through the bushing with its rounded end projecting through a hole in the panel. A lock nut 30 is mounted on the screw and the attaching plate is fashioned with a cup 31 so that the lock nut may be turned partially into the cup and impinge against the edge or rim of the cup, for locking the screw in adjusted position.

Preferably, a wear plate, or circular disk 32 is mounted on the exterior face of the top wall 5 in position to be frictionally engaged by the rounded end of the screw 28. With the parts in position of Figures 1 and 6, it will be apparent that by turning the adjusting screw 28 as required, the front of the projector may readily be positioned for properly focusing the projected picture upon a screen, and when the desired adjustment is secured the parts are locked in adjusted position by means of the lock nut. The weight of the projector, and its rigid attachment by means of screw or stud 14 and the nut N to the base-panel, and the stable support provided by the supporting-panel 8 and the base-panel 10, maintain the projector in rigid position so that the operator's hands are free for manipulating the operating knob K as required.

An electric cord or cable (not shown) extends from the bottom of the lamp housing H to a suitable plug-connection, and this cord is equipped with the customary two-pronged plug for the outlet or plug-connector. After the display of pictures, this plug is removed from the plug-connector and its prongs may be inserted in two sockets 33, 33, indicated in Figure 1 on the top face of the base-panel, the other end of the cord being permanently connected to the projector at the bottom of the lamp housing. The cord thus attached, is then coiled about the projector, the base-panel with the projector, and the supporting panel 8 are folded or swung backward and around, and the stand is also swung from the position of Figure 1 to the position of Figure 2. The two foldable panels are then swung into place as in Figure 2, and the slide latch 23 is then slid into locked or latched position, leaving the apparatus in the position and condition of Figure 2.

Having thus fully described my invention, what I claim as new and desire to secure by Letters Patent is:

1. A rectangular stand comprising a casing having a one-half end-opening and a full length bottom opening, two hinged panels one of which is a half-panel hinged to the casing and standing upright at one end of the casing above its opening, the other panel having a hinged joint with the upper end of the upright panel and disposed in horizontal position above the top of the casing, and means for adjusting the last mentioned panel relative to the top of the casing.

2. A rectangular stand comprising a casing having a full length bottom opening and a one-half end opening communicating therewith, of a half-panel hinged at its lower end to the wall of the end opening, a full length panel hinged to the upper end of the half-panel and disposed horizontally over the top of the casing, and an adjusting screw mounted in the full length panel for co-action with the top of the casing for vertically adjusting the full length panel.

3. In a rectangular article supporting and carrying stand comprising a casing including a top wall having a socket therein and said casing having a full bottom opening and an adjoining end having a one-half opening, of a half panel hinged to the lower edge of the wall of the end opening, a base panel hinged to the half panel to which the article is adapted to be attached, and means including a pin in said base panel aligned, when in folded position and overlying the top wall of the casing, with said socket and adapted for co-action therewith to fasten the free end of the base panel to the casing and said means including means for vertically adjusting said pin in said base panel to elevate or lower the free end of said base panel.

KONRAD KOEHL.